Patented Aug. 2, 1938

2,125,375

UNITED STATES PATENT OFFICE 2,125,375

VAPORIZATION OF FORMALDEHYDE

Wilbie S. Hinegardner, Niagara Falls, N. Y., assignor to E. I. du Pont de Nemours & Company, Wilmington, Del., a corporation of Delaware No Drawing. Application February 24, 1934, Serial No. 712,752

8 Claims. (Cl. 167—26)

This invention relates to the art of fumigating and disinfecting and more particularly to the method of fumigating with formaldehyde by evaporating a solution of the same.

In fumigating operations vapors of formaldehyde are commonly produced by boiling a commercial formaldehyde solution containing around 37% by weight of formaldehyde. This relatively simple method of obtaining formaldehyde vapor has the disadvantage that during the evaporation of the solution the water evaporates at a relatively more rapid rate than the formaldehyde leaving around 15 to 30% of the formaldehyde as a polymer of relatively low volatility. This polymer does not give up formaldehyde vapor with the rapidity ordinarily desired for fumigating and other processes and hence remains in the evaporating apparatus and is usually wasted. When evaporated under a vacuum as much as 60% of the formaldehyde may remain as this polymer.

The object of this invention is to prevent or inhibit the formation of polymers during the evaporation of formaldehyde solutions and more particularly when such solutions are evaporated by heating. A further object is to provide an improved method for fumigating with formaldehyde vapors. Other objects will be apparent from the following description of the invention.

I have discovered that formaldehyde solutions to which a small amount of sulfur dioxide has been added may be evaporated by heating, for example at the boiling point, to completely vaporize the formaldehyde present with the formation of little or no formaldehyde polymer. The amount of sulfur dioxide required to produce this effect may vary from a concentration of a fraction of 1% by weight up to the saturation point. I have found that even the merest traces of sulfur dioxide in a formaldehyde solution will prevent or inhibit polymer formation to a certain extent. The action of the sulfur dioxide is affected in some degree by the stability towards polymer formation of the particular formaldehyde solution used. However, in solution where a small trace of sulfur dioxide fails to completely prevent polymer formation I have found that it inhibits it to a very marked degree.

It is sometimes desirable to evaporate the formaldehyde under a vacuum, where my improved method is particularly desirable. A polymer of formaldehyde is commonly prepared by evaporating a formaldehyde solution under a 20″–28″ vacuum but if 5% or more of sulfur dioxide is added to the formaldehyde solution the formation of polymer may be inhibited or prevented. In many cases even less than 5% of sulfur dioxide will prevent the formation of a polymer on evaporating a formaldehyde solution under a vacuum.

I have further discovered that whereas sulfur dioxide prevents polymer formation during evaporation of a formaldehyde solution at or near the boiling point of solution, on the other hand at low temperatures, e. g., 20° to 25° C. or lower, the addition of sulfur dioxide to a formaldehyde solution tends to accelerate the formation of insoluble polymers on standing. This action of the sulfur dioxide at the lower temperatures is probably due merely to its acidic properties, as it is well known that formaldehyde solutions can be polymerized by acidification particularly at temperatures below 25° to 30° C. I have found that the addition of sulfur dioxide also inhibits polymer formation when formaldehyde is evaporated under vacuum at temperatures above room temperature. In general, the amount of sulfur dioxide required to substantially prevent polymer formation on evaporation will depend upon the evaporation temperature. For example, if the solution is evaporated at or near its atmospheric boiling point, a fraction of 1% of sulfur dioxide may be sufficient to prevent polymer formation, while 10 to 20% of sulfur dioxide may be required to completely prevent polymer formation in evaporation under a vacuum at temperatures of 50° to 75° C.

The polymerizing effect of the sulfur dioxide at low temperatures must be taken into account in the practice of my invention in order to obtain the best results. For example, if it is desired to add the sulfur dioxide to the formaldehyde solution at the time of its manufacture, the amount of sulfur dioxide added should not be great enough to produce an acidity which would cause polymer formation under the conditions under which the solution is to be stored and/or shipped prior to its use as a fumigant. As is well known in the art of manufacturing and handling formaldehyde solutions, the stability of a formaldehyde solution against polymer formation depends not only upon the acidity or alkalinity of the solution but also upon the presence of substances which may either increase or decrease the tendency for polymer formation. Thus various substances are used to prevent polymer formation during the storage of formaldehyde solutions; for example, methanol or ethyl alcohol is commonly added to formaldehyde solutions for this purpose. Commercial 37% formaldehyde solutions usually contain 10 to 15% of methanol. Such solutions are stable against formaldehyde polymer formation at temperatures as low as 0° C. and −10° C., respectively, provided that the acidity of the solution does not exceed that represented by a pH value of about 2.75.

If it is desired to practice my invention by adding sulfur dioxide at the time of fumigation, much larger amounts may be used; in fact, if desired, the solution may be completely saturated with sulfur dioxide. However, if the amount added is such as would accelerate polymer formation at room temperature, the solution preferably should be evaporated in the fumigating apparatus within a short time after adding the $SO_2$, before there has been an opportunity for substantial polymerization to occur. In general, after adding the sulfur dioxide, the solution may stand for several hours at atmospheric temperature without substantial precipitation of polymer.

In general, for evaporation at the boiling point, I prefer to add not more than 5% by weight of sulfur dioxide to the formaldehyde solution. Such amounts are sufficient in practically every case to substantially completely prevent polymer formation on evaporating the solution to dryness at or near its boiling point either at atmospheric pressure or under an ordinary vacuum and for many purposes the amount of sulfur dioxide evolved from a solution containing as much as 5% by weight is not objectionable. In most cases 0.5 to 2% sulfur dioxide is sufficient. In most fumigation operations it is advantageous to avoid the use of a larger amount than 5% by weight of sulfur dioxide because of the corrosive or tarnishing effect of this substance on metallic articles and the like and its bleaching action. Although sulfur dioxide itself is a rather efficient fumigant and disinfectant, its use is restricted because of its corrosive and bleaching effects. In some cases even the small amounts of sulfur dioxide generated from a solution containing 5% of it may be objectionable; in such cases I prefer to use 0.5 to 1% of sulfur dioxide by weight in the solution; the amount of sulfur dioxide generated from such a mixture is in general insignificant. Still smaller amounts of sulfur dioxide, e. g., less than 0.1% by weight, often may be used to advantage and even in cases where such small amounts do not completely prevent polymer formation, the formation of polymer will be inhibited to a marked degree.

I am aware that it has been proposed to prepare a fumigating and disinfecting preparation by completely saturating a formaldehyde solution with sulfur dioxide whereby a compound is formed by the reaction of these two substances in water. Such a preparation is said to be not only stable when the solution is boiled to evaporate the formaldehyde but is also stable at relatively low temperatures, since in this case the formation of the sulfur dioxide-formaldehyde compound, which does not readily polymerize, counteracts the acidifying effects of adding sulfur dioxide to the formaldehyde soluton. However, unless substantally all of the formaldehyde in the solution is thus combined with the sulfur dioxide, the solution will not be stable at a low temperature; that is, the formaldehyde which is not so combined is free to polymerize. So far as I am aware, it has not heretofore been known that amounts of sulfur dioxide less than that required to completely react with the formaldehyde to form the above mentioned compound would prevent the formation of polymer on evaporation of the solution by the application of heat.

My invention may be illustrated by the following examples:

Example 1

Three samples of 1 kilogram each of a commercial grade of formaldehyde were placed in separate containers; to two of these was added 0.5% and 2.0% by weight, respectively, of sulfur dioxide. The three samples then were evaporated to dryness by continuous boiling, care being taken to maintain the same rate of evaporation in each. The temperature of each sample was measured by thermometers extending into the boiling liquid. The samples containing the sulfur dioxide were completely evaporated in about 95 minutes, leaving substantially no residue. The sample containing no sulfur dioxide was evaporated to dryness in about 87 minutes, leaving a solid residue of formaldehyde polymer which was found to be equivalent to 19.5% by weight of the formaldehyde in the original sample. The evaporation boiling temperatures are shown in the following table:

| Time | Volume of liquid | Temperature of boiling liquid (°C.) | | |
|---|---|---|---|---|
| | | A (0.5% $SO_2$) | B (2.0% $SO_2$) | C (no $SO_2$ added) |
| | Cubic centimeters | Degrees | Degrees | Degrees |
| Start | 980 | 94.0 | 92.5 | 95.0 |
| | 900 | 96.8 | 96.8 | 98.2 |
| | 700 | 99.1 | 99.3 | 100.6 |
| 33 mins | 600 | 99.2 | 99.3 | 101.5 |
| 42 mins | 500 | 99.6 | 99.4 | 102.8 |
| | 300 | 100.4 | 100.5 | 105.7 |
| | 200 | 101.0 | 101.2 | 117.5 |
| 84 mins | 100 | 101.5 | 101.5 | 127.2 |
| | 25 | 102.4 | 102.5 | (Dry residue at 87 mins.) |
| 95 mins | (Dry) | (No residue) | (No residue) | |

Example 2

To a sample of the 37% commercial formaldehyde described in Example 1 was added 0.07% by weight of sulfur dioxide and the solution was heated at its boiling point at atmospheric pressure until the liquid was completely evaporated. In this case 7.1% of the formaldehyde remained as solid polymer.

Example 3

Three samples of 37% formaldehyde solution, each containing 5% by weight of sulfur dioxide, were evaporated under a vacuum of 25 inches of mercury at different liquid temperatures. The following results were obtained:

| Sample | Temperature °C. | Percent of $CH_2O$ left as solid residue |
|---|---|---|
| A | 50 | 66 |
| B | 75 | 50 |
| C | 100 | None |

Example 4

Samples of 37% formaldehyde solution, containing varying amounts of sulfur dioxide, were evaporated under a vacuum of 25 inches of mercury at different liquid temperatures. The results obtained were as follows:

| Sample | Percent SO$_2$ | Temperature °C. | Percent of CH$_2$O left as solid residue |
|---|---|---|---|
| A | 5 | 85 | None |
| B | 5 | 95 | None |
| C | 5 | 95 | None |
| D | 14 | 75 | None |
| E | 20 | 50 | None |

In practising my invention I may add the sulfur dioxide to the formaldehyde solution by passing a stream of sulfur dioxide gas into the solution or by adding it in the form of an aqueous solution. Likewise I may add a compound of sulfur dioxide or a solution of such compound which on heating will decompose to liberate at least a small amount of sulfur dioxide. For example, in one method of practising my invention, prior to evaporating the formaldehyde solution a small amount of the compound made by saturating a formaldehyde solution with sulfur dioxide is added thereto. Preferably the sulfur dioxide compound used is one which is substantially completely volatile so that no substantial amount of solid residue of any sort is left upon evaporation of the formaldehyde solution to which it has been added. I also have found bisulfites, e. g., sodium bisulfite (NaHSO$_3$), to be effective in preventing polymer precipitation on evaporation of formaldehyde solutions. However, this is not my preferred method because the inorganic bisulfites not only leave insoluble residues but tend to cause foaming. The sulfur dioxide or bisulfite compound of another aldehyde as benzaldehyde or acetaldehyde, may be used. The bisulfite apparently is effective by reason of its reaction with the slight amount of acid normally present in formaldehyde solutions to liberate sulfur dioxide.

In fumigation by evaporation of formaldehyde solutions it is sometimes desirable to utilize solid formaldehyde polymer or "paraform" by heating it in contact with water to dissolve all or part of the paraform and then continuing heating until complete evaporation is secured. My invention is useful in this procedure in effecting more complete transformation of the original paraform into formaldehyde vapor. In utilizing my invention in this method of fumigating, I prefer to first heat the solid paraform with water until it is at least partly dissolved and then to add the required amount of sulfur dioxide or equivalent and proceed with the evaporation.

The sulfur dioxide or decomposable sulfur dioxide compound may be added either before vaporization of the solution or during vaporization before substantial amounts of polymer have been formed with equally satisfactory results.

While my invention is especially adapted to fumigating operations where it is desirable to quickly and completely evolve the formaldehyde in gaseous form in a space to be fumigated, it is not restricted to this use but may be employed in various arts where formaldehyde vapors are required. My invention avoids loss of formaldehyde by polymerization and in the preferred form of my invention, the solution is completely evaporated to form formaldehyde vapor, water vapor and a very small amount of sulfur dioxide, leaving substantially no solid residues. A further advantage is that the presence of the sulfur dioxide decreases the boiling point of the solution somewhat, particularly near the end, thereby allowing the evaporation to take place at a lower temperature.

I claim:

1. The method of inhibiting polymer formation in a boiling formaldehyde solution comprising adding to said solution sulfur dioxide in an amount less than that required for saturation.

2. The method of inhibiting polymer formation in a boiling formaldehyde solution comprising adding to said solution a small amount of sulfur dioxide.

3. The method of preventing polymer formation in a boiling formaldehyde solution comprising adding to said solution 0.5 to 5.0% by weight of sulfur dioxide.

4. A composition of matter comprising an aqueous formaldehyde solution containing a small amount of sulfur dioxide, said amount of sulfur dioxide being substantially less than that amount stoichiometrically equivalent to the amount of formaldehyde present.

5. A composition of matter comprising an aqueous formaldehyde solution containing 0.5 to 5.0% by weight of sulfur dioxide, said amount of sulfur dioxide being substantially less than that amount stoichiometrically equivalent to the amount of formaldehyde present.

6. A process for evaporating a formaldehyde solution comprising boiling an aqueous formaldehyde solution which contains a small amount of sulphur dioxide.

7. A process for evaporating a formaldehyde solution comprising boiling an aqueous formaldehyde solution which contains sulphur dioxide in an amount less than that required for saturation.

8. A process for evaporating a formaldehyde solution comprising boiling an aqueous formaldehyde solution which contains 0.5 to 5.0% by weight of sulphur dioxide.

WILBIE S. HINEGARDNER.